Aug. 2, 1966 A. B. HERPOLSHEIMER 3,263,727
LOCK WASHER ARRANGEMENT
Filed Sept. 23, 1964 2 Sheets-Sheet 1

INVENTOR.
ARTHUR B. HERPOLSHEIMER
BY Gardner & Zimmerman
ATTORNEYS

Aug. 2, 1966          A. B. HERPOLSHEIMER          3,263,727
                      LOCK WASHER ARRANGEMENT
Filed Sept. 23, 1964                              2 Sheets-Sheet 2
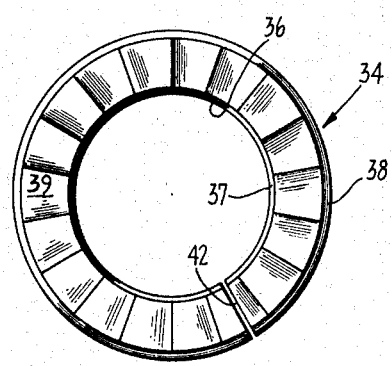
Fig_8
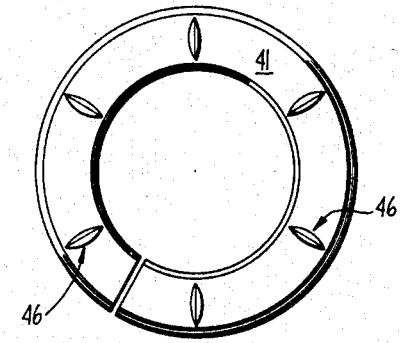
Fig_9
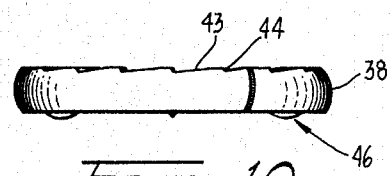
Fig_10
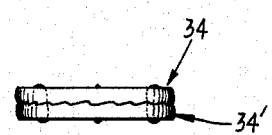
Fig_11
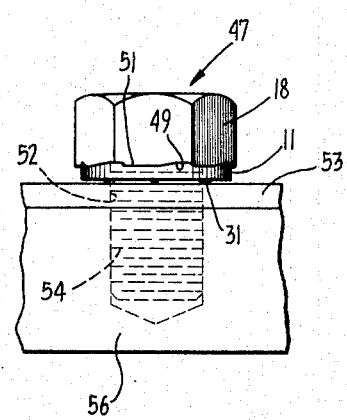
Fig_12
INVENTOR.
ARTHUR B. HERPOLSHEIMER
BY
Gardner & Zimmerman
ATTORNEYS

United States Patent Office 3,263,727
Patented August 2, 1966

3,263,727
LOCK WASHER ARRANGEMENT
Arthur B. Herpolsheimer, 1240 Benedict Canyon Drive,
Beverly Hills, Calif.
Filed Sept. 23, 1964, Ser. No. 398,574
1 Claim. (Cl. 151—34)

This invention relates to lock washers in general, and is particularly directed to a two piece lock washer arrangement for locking a threaded fastener in an assembly which may yet be released by loosening the fastener.

It is an object of the present invention to provide a lock washer arrangement including two components having interengageable inclined cam surfaces which function to reverse any loosening force component caused by the thread helix angle of a fastener associated therewith.

A very important object of the invention is to provide a lock washer arrangement of the class described wherein the cam surfaces are designed to lock together in the tightening direction of rotation of a threaded fastener, and to over-ride in the loosening direction to facilitate easy release of the washer arrangement by merely loosening the fastener.

Another object of the invention is to provide a lock washer arrangement of the class described wherein the height of the cam surfaces is just sufficient to control any working load elongations of the associated threaded fastener without permitting loosening thereof such that the desired locking action is achieved and yet the cam surfaces may be over-ridden to allow loosening of the fastener without exceeding the elastic limit thereof.

It is still another object of the invention to provide interlocking lock washers having teeth on the opposite sides thereof from the cam surfaces designed to lock the washers to the underside of a nut, or material of the surface of a fastened joint so as to prevent slippage therebetween and thereby insure that the cam locking and over-riding actions will occur in a fastener assembly.

Yet another object of the invention is to provide a lock washer arrangement of the type outlined above in which one of the interengageable cam locking components may be integrally included in a bolt or other fastener to cooperate with a washer comprising the other component of the arrangement.

It is a further object of the invention to provide lock washers of the class described which may be manufactured in accordance with simple production methods with minimum material costs and scrap loss to thereby result in lock washers of comparatively low cost.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

FIGURE 8 is a plan view of the interlockable cam face of a modified form of lock washer in accordance with the invention.

FIGURE 9 is a plan view of the opposite face of the modified washer.

FIGURE 10 is an elevation view of the modified washer.

FIGURE 11 is an elevation view on a reduced scale of a pair of the modified washers in interengaged assembled relation.

FIGURE 12 is an elevation view of another modified form of lock washer arrangement in accordance with the invention, this arrangement having one of the interengageable cam locking components thereof integrally contained in a bolt.

Figures 1, 2:
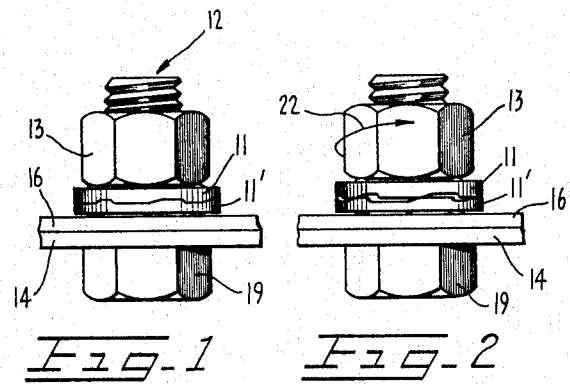
FIGURE 1 is an elevation view of a lock washer arrangement in accordance with the present invention as employed in a nut and bolt assembly to provide a locked joint.
FIGURE 2 is a view similar to FIGURE 1, but illustrating release of the lock washer arrangement by loosening the nut.
Figure 3:
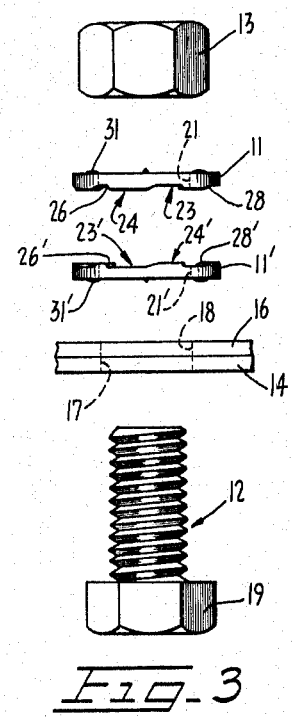
FIGURE 3 is an exploded elevation view of the fastener assembly of FIGURES 1 and 2.

Considering now the invention in some detail and referring to the illustrated form thereof in the drawings, there will be seen to be generally provided a lock washer arrangement for use with studs, bolts, and the like to provide threaded fastener joints which are locked against loosening resulting from cyclic loading, vibration, etc. To this end, the lock washer arrangement includes two components respectively having faces formed with inclined cam surfaces which are interengaged with each other when the arrangement is employed in a threaded fastener joint. The lock washer components are further provided with means for securing same to adjacent surfaces of nuts, bolt heads, or joint members to prevent slippage therebetween in the locked fastener assembly. The cam surfaces of the lock washer components are designed to function as inclined planes or wedges which redirect loosening forces on a bolt or other threaded fastener in a tightening direction. Loosening force on a threaded fastener results from a vector component of the pre-load on the fastener being directed along the lead angle or helix of the thread in a loosening direction. However, a vector component of compressive force on the lock washer components functions as a holding force therebetween which counteracts the loosening force inasmuch as the washer components are locked to adjacent surfaces of nuts, bolt heads, or other elements of the fastener assembly. In order that the holding force exceeds the loosening force, the inclined cam surfaces of the lock washer components have a minimum angle greater than the maximum lead angle of any thread series of fastener with which the lock washer may be employed.

It will be appreciated that the lock washer components of the present invention, by virtue of their effectiveness in counteracting loosening force on a threaded fastener, may undesirably prevent intentional loosening of the assembly to the extent that the fastened joint could not be disassembled without damage or breakage to the assembly. Accordingly, as a particularly important feature of the present invention, the lock washer components are so designed that although the interengaged cam surfaces thereof counteract loosening force on an associated threaded fastener, the cam surfaces may be over-ridden upon the application of intentional loosening force to the fastener, without exceeding the elastic limit of the fastener. In this regard, the height of the inclined cam surfaces of the lock washer components is just sufficient to control any working load elongations of the fastener without allowing loosening. The cam height or rise is insufficient to effect a fastener elongation upon over-riding of the cam surfaces, which exceeds the yield point of the fastener.

Considering now the invention generally outlined above in greater detail with respect to several specific structural forms thereof as illustrated in the drawings, and referring first to FIGURES 1–7, the lock washer arrangement may be of a form wherein the washer components are provided as two identical lock washers 11, 11'. In the instant embodiment the washers are operatively incorporated in a threaded fastener assembly including a bolt 12, nut 13, and joint elements 14, 16 to provide a locked fastener joint between the latter elements. In this regard, the bolt 12 extends through registering apertures 17, 18 provided in joint elements 14, 16, the head 19 of the bolt engaging the exterior surface of one element 14. Central openings 21, 21' of washers 11, 11' receive the threaded shank of bolt 12 and the nut 13 is in turn threaded upon the free end thereof. The nut is rotated in the tightening direction (clockwise as viewed in FIGURES 1 and 2) to clamp the washers 11, 11' between the nut and exterior surface of joint element 16. The exterior surfaces of washers 11, 11' thereby respectively engage the nut and exterior surface of joint element 16. The washers 11, 11' are designed such that when so incorporated in the fastener assembly they counteract loosening force tending to effect relative rotation between the nut 13 and bolt 12 in a loosening direction (counterclockwise rotation of nut 13 as viewed in FIGURES 1 and 2). Yet the resulting locked threaded fastener joint may be disassembled without damage or destruction by intentionally twisting nut 13 in the loosening direction (counterclockwise as indicated by the arrow 22 in FIGURE 2). In the accomplishment of the above, the washers 11, 11' are respectively provided with interengageable cam faces at their interior engaged surfaces, and means at their exterior surfaces for non-slipping locking engagement with the nut 13 and exterior surface of joint element 16, in accordance with the general considerations advanced hereinbefore.

Figure 4:
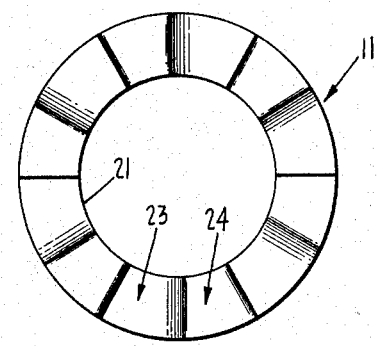
FIGURE 4 is an enlarged plan view of the interlockable cam surface face of one washer of the arrangement.
Figure 5:
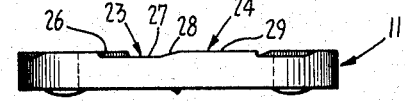
FIGURE 5 is an elevation view of the washer.
Figure 7:
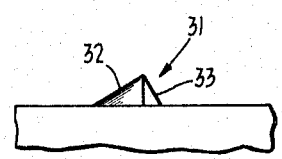
FIGURE 7 is a fragmentary elevation view on an enlarged scale taken at line 7—7 of FIGURE 6, illustrating a preferred configuration of tooth provided on the washer for locking same to a nut or material of the surface of a fastened joint to prevent slippage therebetween.
Figure 6:
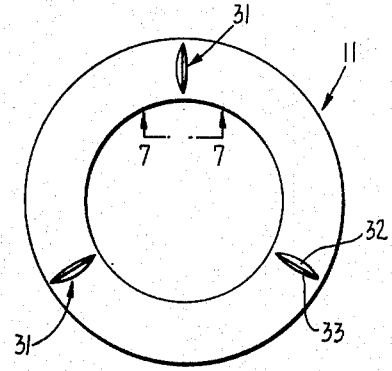
FIGURE 6 is a plan view of the opposite face of the washer from that shown in FIGURE 4.

As best illustrated in FIGURES 4 and 5, the cam face surface of each washer 11, 11' is formed by an alternating circumferential succession of shallow depressions 23 and complementary projections 24 whereby the depressions 23 of washer 11 are engageable by the projections 24' of washer 11' while the projections 24 of washer 11 are engageable with the depressions 23' of washer 11'. Each depression 23 is defined at one end by a stop shoulder 26 outwardly stepped at substantially right angles from one end of a flat base 27 and at the other end by a cam surface 28 outwardly inclined from the other end of base 27. Each projection 24 adjacent a depression 23 in the loosening direction of rotation of a fastener asesmbly in which the washers are to be employed (counterclockwise in the assembly of FIGURES 1 and 2) is in turn defined at its first end by an inclined cam surface 28 terminating at a first end of a flat crest 29 and at its second end by a stop shoulder 26 extending substantially right angularly inward from the second end of the crest. Thus, as the interengaged washers 11, 11' are rotated relative to each other in the loosening direction the cam surfaces 28, 28' will bear against each other. Conversely, if the washers are rotated in the tightening direction the stop shoulders 26, 26' will bear against each other. The minimum angle of inclination of the cam surfaces is greater than the maximum lead angle of any thread series of fastener and the cam rise, i.e., the depthwise distance between the bases 27 and crests 29, is no greater than that required to control working load elongations of a fastener without allowing nut loosening.

As regards the means for preventing slippage between the exterior surfaces of washers 11, 11' and other elements of the locked fastener assembly, same may be provided as any protuberance raised from these washer surfaces which will engage and bite into an adjacent surface when compressed thereagainst. Preferably, these protuberances are provided in the instant embodiment as a plurality of circumferentially spaced radial teeth 31 of the configuration best shown in FIGURES 6 and 7. These teeth have proven particularly advantageous where they have a front face 32 (i.e., face in the tightening direction of rotation) inclined at 30° from the washer face and a rear face 33 inclined at 60° therefrom. Each tooth is crowned at the top to provide a point contact edge which produces a highly effective cutting action upon adjacent joint element surfaces. As the fastener assembly is tightened the adjacent joint element surfaces slip over the point contact edges of the teeth and remove a small portion of metal therefrom, while the teeth cut into the surfaces to prevent slippage between the outer washer surfaces and adjacent joint element surfaces. Thus, in the embodiment of FIGURES 1 and 2, the teeth 31 of washer 11 lock this washer to nut 13, while the teeth 31' of washer 11' lock this washer to the exterior surface of joint element 16. Thus, subsequent to the initial tightening of the assembly, the nut 13 and washer 11 rotate as a unit with respect to washer 11' which is locked to joint element 16.

With the fastener assembly tightened as just described, and illustrated in FIGURE 1, a working load in excess of the tightening pre-load tends to rotate the nut 13 in the loosening direction. However, the nut is locked to washer 11 such that this washer tends to be rotated in a loosening direction relative to the fixed washer 11'. The cam surfaces 28, 28' of the respective washers 11, 11' are thus urged into intimate bearing relation to hold the nut in its original position. Now assume that it is desired to loosen and disassemble the fastener assembly. This is accomplished by rotating nut 13 in the loosening direction, as illustrated in FIGURE 2. The washer 11, being locked to the nut, is likewise turned in a loosening direction. Sufficient torque is applied to the nut to cause the cam surfaces of the respective washers to over-ride each other as illustrated, and in this regard the elongation of the bolt 12 caused by the over-riding of the cams is less than the yield point of the bolt by virtue of the rise or height of the cam faces being relatively small and just sufficient to control working loads on the assembly. Once the cams are over-ridden, the nut may be readily unscrewed from the bolt to facilitate disassembly of the joint.

Referring now to FIGURES 8–11, a modified form of lock washer arrangement in accordance with the present invention is depicted as including a pair of like lock washers 34, 34' which are of a form conducive to manufacture by simple production techniques with minimum material costs and scrap loss. More particularly, each washer 34 is of annular configuration and thus has a central circular opening 36 for receiving a bolt or equivalent threaded fastener. The inner and outer peripheries 37 and 38 of the washer are rounded as viewed in radial cross section and the opposite faces 39, 41 of the washer are substantially flat. In addition the washer preferably, although not necessarily, is provided with a radial split 42. Washer face 39 is formed with a circumferential succession of shallow saw tooth serrations which define gradually inclined cam surfaces 43 terminating in sharply inclined stop shoulders 44. The inclination and rise of cam surfaces 43 are selected in accordance with the considerations noted hereinbefore, i.e., the inclination exceeds the maximum lead angle of threaded fasteners with which the washers are to be employed and the rise is just sufficient to control any working load elongations of a fastener without allowing loosening thereof. Alternatively, washer face 39 may be formed with alternate depressions and projections of the type included in the embodiment of FIGURES 1–7. Washer face 41 is formed with a plurality of circumferentially spaced radial teeth 46, which may be advantageously of the configuration of teeth 31 described hereinbefore with respect to FIGURE 7.

The washers 34, 34' are employed in a fastener assembly in a manner similar to that discussed relative to the embodiment of FIGURES 1 and 2. In this regard the washers are disposed as indicated in FIGURE 11 with the respective cam surfaces 43 and stop shoulders 44 thereof interengaged. The teeth 46 of the outer faces 41 of the respective washers then serve to lock same to other elements of a fastener assembly.

With regard to the manufacture of the washers 34 with minimum material costs and scrap loss, it will be appreciated that their configuration is conducive to manufacture from wire as a starting material. A length of wire may be subjected to a simple embossing operation to form the substantially flat faces 39, 41 with cam surfaces 43 and stop shoulders 44, and teeth 46 respectively thereon. The embossed wire may be then formed about a mandrel and cut-off to thereby result in the configuration of washer 34. Thereafter, the washer may be heat treated, the split 42 providing freedom from warping during this operation.

A further modification of the invention is illustrated in FIGURE 12, wherein one component of the lock washer arrangement is integrally included with a threaded fastener. More particularly, a bolt 47 is provided including a head 48 having an inner face formed with a circumferential succession of alternate depressions 49 and complementary projections 51 comparable to and interengageable with the depressions 23 and projections 24 of washer 11. A locked fastener assembly is provided upon extending the shank of the bolt 47 through a washer 11 and aperture 52 of a joint element 53, and screwing the shank into a tap 54 of a subjacent joint element 56. The depressions and projections of the bolt head interengage the projections and depressions of the washer, and the teeth 31 of the washer cut into the adjacent surface of joint element 53 to prevent slippage therebetween. The cam surfaces of the bolt head and washer operate in the manner previously described to counteract working load loosening forces on the bolt. The bolt, however, may be rotated in a loosening direction with sufficient torque to over-ride the cam surfaces and loosen the fastener assembly without exceeding the elastic limit of the bolt.

What is claimed is:

A lock fastener assembly comprising first and second joint elements having registering apertures therethrough, a bolt having a head engaging said first joint element and a threaded shank extending through said apertures, a pair of annular lock washers disposed about said shank of said bolt, and a nut threaded upon the free end of said shank, said lock washers each having a first face with a circumferential succession of alternate shallow depressions and complementary projections including interconnected inclined cam surfaces and substantially right angular stop shoulders and each having a second face with a plurality of circumferentially spaced radial teeth, said depressions each including a flat base and said projections each including a flat crest with said bases and crests being alternately connected by said inclined cam surfaces and stop shoulders, said depressions and projections of first faces of the respective washers being interengaged, said teeth of said second faces of said washers each having 30° and 60° oppositely inclined faces intersecting at a crowned cutting edge with the 30° face of the teeth being in the tightening direction of rotation, said crowned cutting edges being convexly curved in a radial direction to initially provide a point contact respectively with said nut and said second joint element, when said fastener assembly is tightened, said teeth respectively engaging said nut and said second joint element in non-slipping relation thereto, said cam surfaces each being inclined in the same direction as the threads on said shank and having an inclination angle greater than the thread lead angle of said bolt, said cam surfaces each having a rise just sufficient to hold said washers in interengagement with each other in response to working load loosening forces between said nut and bolt and insufficient to elongate said bolt beyond its yield point in response to over-riding of said cam surfaces.

References Cited by the Examiner

UNITED STATES PATENTS

| | | | |
|---|---|---|---|
| 723,590 | 3/1903 | Durboraw | 151—35 |
| 743,822 | 11/1903 | Bryar | 151—35 |

FOREIGN PATENTS

| | | |
|---|---|---|
| 415,345 | 4/1910 | France. |
| 684,466 | 11/1939 | Germany. |
| 907,826 | 10/1962 | Great Britain. |

EDWARD C. ALLEN, *Primary Examiner.*